Patented Nov. 9, 1937

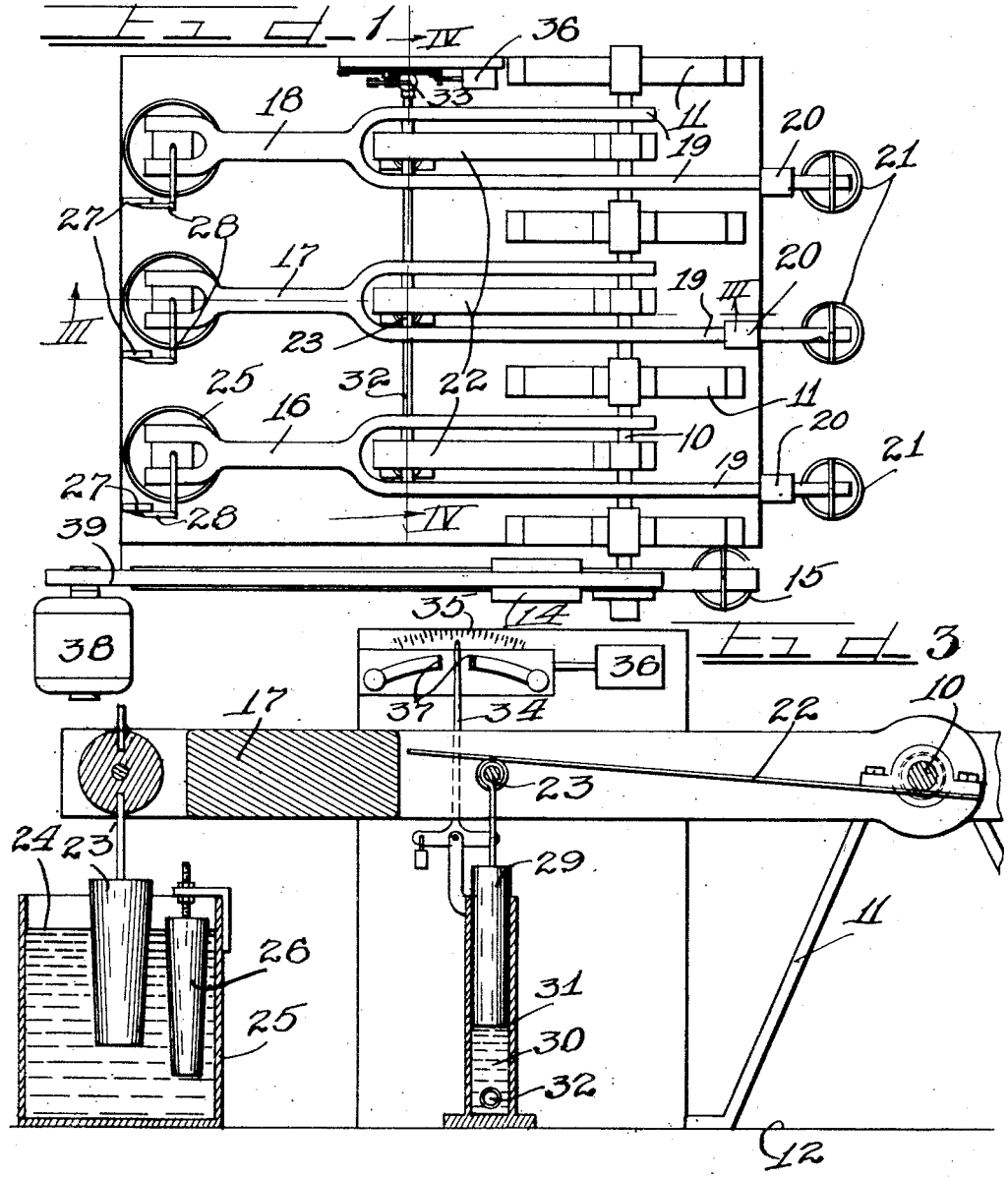

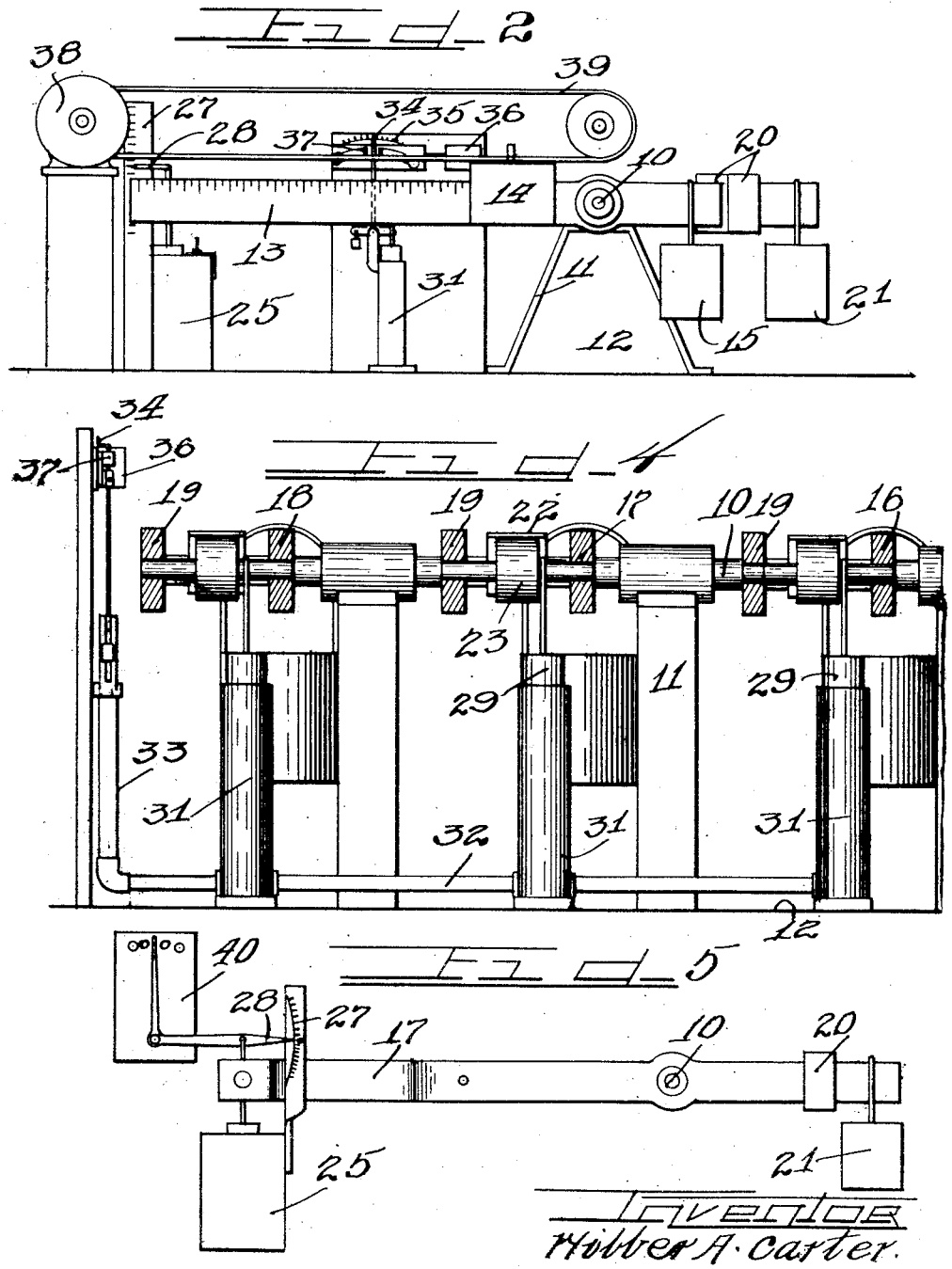

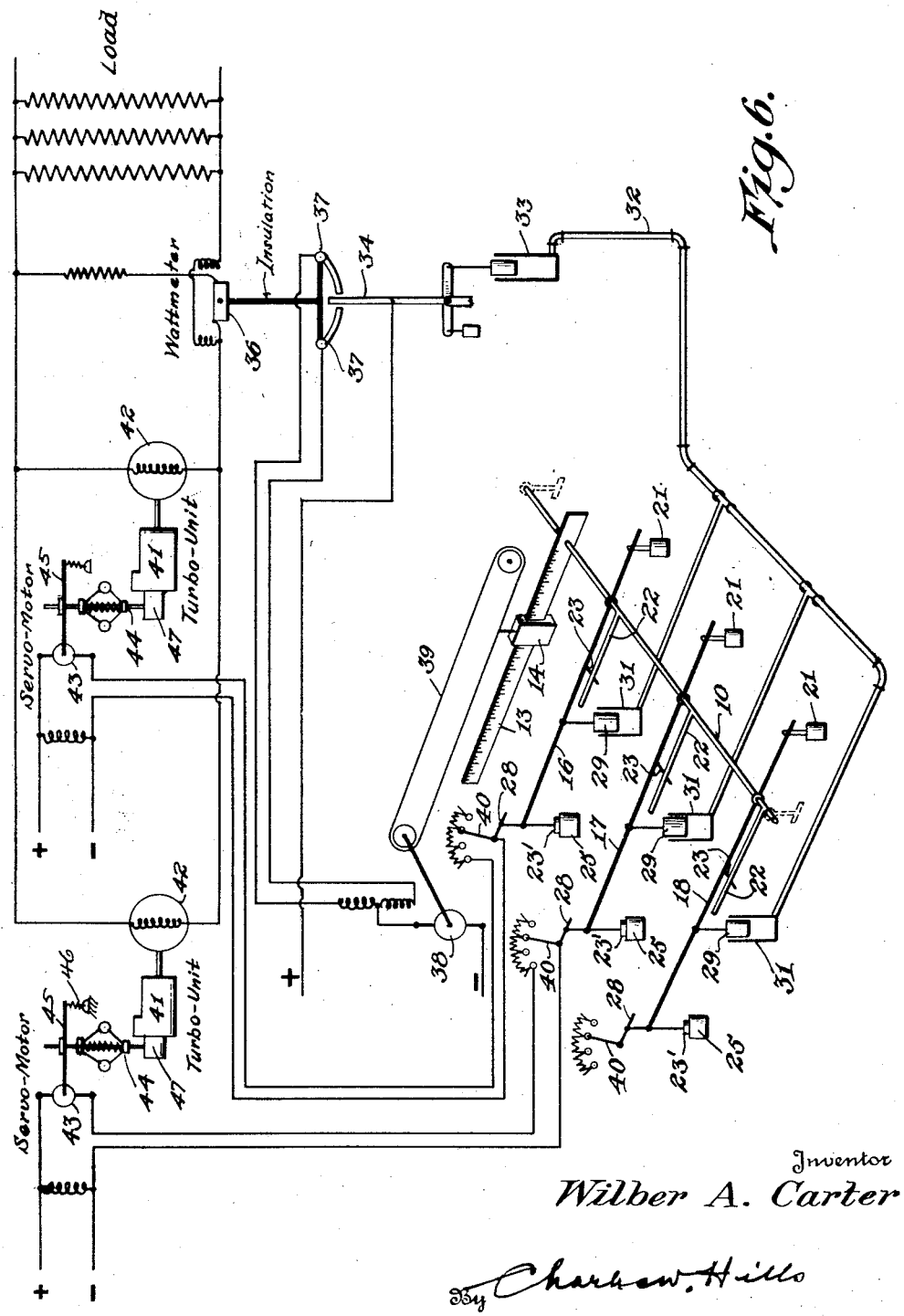

2,098,654

UNITED STATES PATENT OFFICE 2,098,654

LOAD ALLOCATING DEVICE

Wilber A. Carter, Detroit, Mich.

Application July 21, 1932, Serial No. 623,834

18 Claims. (Cl. 290—4)

My invention relates to a device for indicating and/or regulating the combination of values of an independent variable, such as the load on a generator unit, in a group of functions so that the ratio of the sums of independent and dependent variables in these functions will have, in one case, a minimum value, or in another case, a maximum value.

It is an object of my invention to provide an instrument to indicate at a glance the proper loading of each of a plurality of generators connected in parallel in an electric generating station with different station loads.

It is also an object of my invention to provide an instrument to accomplish the above object, and capable of being adapted to adjust the load on each of a plurality of generators connected in parallel in an electric generating station with different station loads so as to obtain the most economical operation of each generator.

It is another object of this invention to provide an instrument to indicate and/or control the division of a varying total load among a plurality of load carrying units in proportions to maintain the most economical distribution of the load.

Other and further important objects of my invention will appear in the description of my invention.

On the drawings:

Figure 1 is a plan view of an instrument embodying the features of this invention.

Figure 2 is an elevation of the machine from the torque loading side.

Figure 3 is a fragmentary section on the line III—III of Figure 1 showing one individual load balancing arm as well as the totalizing, indicating and control arrangement.

Figure 4 is a section on the line IV—IV of Figure 1 showing the totalizing, indicating and control arrangement.

Figure 5 is a view of an individual arm arranged to control a rheostat for controlling the output of one of several generators operating in parallel.

Figure 6 is a diagrammatic showing of the instrumentalities hereinafter described and their connecting electric circuits.

In the drawings:

While I have chosen to illustrate my invention as applied to an instrument self-adjustable to indicate and regulate what proportion of the total power demand or load on an electric generating station should be carried by each of a number of generators connected in parallel, I desire to have it understood that in its broader aspects my invention is not limited to such an installation as in principle it operates to vary the proportioning of a number of dependent and independent variables to produce a desired summation thereof.

The illustrated structure comprises a shaft 10 freely mounted in bearings on standards 11 on a suitable base 12. The shaft carries a torque producing arm 13 resembling a scale beam, and the arm has a sliding weight 14 thereon for applying various torque strains to the shaft. The arm is also counter-balanced by a weight 15. In its simplest form the weight 14 would be manually adjusted along a scale marked on the arm to represent the total energy requirements required to drive the several generating units. An automatic control thereof will be described hereinafter. The torque for several different positions of the weight 14 on the arm is comparable, say, to the energy requirements of the generating station, or to some other total quantity it is desired to distribute over several units.

If we assume that there are three generators operating in parallel each generator will be represented by one of the identical arms 16, 17 and 18, each of which is bifurcated and freely pivoted on the shaft 10 and is provided with a counterweight arm 19 carrying a sliding weight 20 as well as a predetermined weight 21 suspended therefrom. Torque from the shaft 10 is applied to the arms 16, 17 and 18 by springs 22 clamped to the shaft and bearing against rollers 23 mounted near the crotch of the arms. Movement of the arms, in response to the torque imposed thereon by the springs 22, is opposed by suitable resisting means applied to the arms at some suitable point as at the outer ends thereof. By suitably varying the resisting means and the counterbalancing of the arm, each arm can be individually matched to the characteristics of the generator it represents and the sum of the torque resistances of the individual arms equals the torque applied to the shaft.

The resisting means may comprise a body 23' floated in a pool of mercury 24 in a suitable container 25, the body 23 being so shaped that the counter-effort thereof simulates the individual load characteristics of a generator unit, such for example as the amount of energy units required per hour at different loads. I have found that such load carrying characteristics may require a complicated profile for the body 23 if used alone but that if a secondary vertically adjustable body 26 is hung in the mercury pool a combination of varying frustro-conical body shapes can be selected to closely approximate the individual characteristics of each generating unit.

It will be understood that if several generators of equal rating are connected in parallel to the station load, it would not follow that because their full load rating is the same, that each should carry an equal proportion of the connected load at all times, because their combined prime mover and generator efficiencies are not usually the same over the entire load range, and it is not at all usual to find that equal loading gives the highest overall economy for the station.

It will be obvious from the foregoing that when the bodies 23 and 26 are suitably shaped to give a desired countereffort or load simulating characteristic for each individual generator, and the torque weight 14 is positioned to simulate the total energy requirements to operate the station, the arms 17, 18 and 19 are moved against the countereffort devices to indicate on suitably graduated scales 27, placed adjacent pointers 28 on the outer ends of the arms, what share of the load each generator should carry to give the highest station economy.

While a scale applied to the torque arm may carry suitable indicia to indicate the setting for the energy required by the station, a refinement thereof comprises a series of displacement plungers 29 each operated by the movement of one of the arms 16, 17 and 18 to displace fluid 30 from chambers 31, the displaced fluid flowing through a pipe 32 to a chamber 33 to operate a float therein which swings a load totalizing pointer 34 over a scale 35, carrying suitable indicia.

If automatic operation of the torque applying weight is desired a conventional station load demand wattmeter indicated generally by the numeral 36 may be provided to shift spaced electrical contacts 37 disposed in the path of the totalizing pointer 34, the pointer and the contacts being arranged as a reversing switch for a reversing motor 38 driving a belt 39 attached to the weight 14 to shift the same along the arm 13 until the instrument is balanced on the total load, at which time the pointer 34 will be midway between contacts 37. Further switching mechanism indicated generally by the numerals 40 may be connected to each generator arm 16, 17 and 18, respectively, to electrically control the prime mover 41 for each generator 42 in any conventional manner through a conventional servo-motor connected to variably adjust the governor mechanism 44 connected to the steam admission valve mechanism of the prime mover.

To avoid confusion of lines a simple circuit arrangement is shown in Figure 6, and in which a servo-motor 43, adapted to produce torque in one direction of movement, is connected to suitable linkage means 45 to adjust the governor 44 against the opposing force of a spring 46 and thus control the steam admission valve mechanism indicated generally by the numerals 47. Movement of the armature of the motor in one direction of rotation is effected by current through the armature under control of the rheostatic switch 48, and movement in the opposite direction is effected by the spring 46, or its equivalent.

Examples of conventional forms of servo-motors connected to move an element against the opposing force of a spring or weight when producing torque in one direction of rotation are given in the Saavolly Patent 1,361,408 of Dec. 11, 1920, the McFarlane et al. patent, 1,019,676 of March 5, 1912, and the Price Patent 1,022,001 of April 2, 1912. Another conventional form of a servo-motor, connected to variably adjust the governor of a prime mover, is shown in the Hewlitt Patent 745,349 of Dec. 1, 1903, but in which showing rotation of the armature of the motor in the forward and return directions is effected by current instead of employing a spring to effect return movement of the armature. It will be understood that the showing of the switching mechanism is merely diagrammatic to avoid confusion of lines, and that the electrically connected instrumentalities may be variously connected by those familiar with the electrical art.

The device described is one for indicating or regulating at any particular setting the sum of the independent variables and also the individual independent variables. Further than this the summation of the dependent variables at such particular setting is also indicated. In a practical embodiment, the sum of the independent variables is the total station load while the corresponding summation of dependent variables is the minimum energy requirements for carrying such load.

In the original balanced condition of the device, the summation force of the dependent variables is counterbalanced by forces representing the individual functions where the independent variable is at its minimum value in one case, and at its maximum value in another case. A change in the position of the weight 14, a change in the magnitude of this summation force, will cause the mechanism to assume a new balance position. The flexible or yielding parts of the mechanism will allow the forces representing the individual functions to adjust themselves so that the combination of the independent variables will result in a minimum ratio of the summation of the two variables $$\left( \frac{\text{station load}}{\text{total B. t. u. per hr. required}} \right)$$

The values of the independent variables in the combination are represented by the position of those parts of the mechanism that apply the force representing the individual function, the position of the end of the arm to which the body 18 is connected.

It will be obvious that if it is desired to run one of the generators of a group of generators in parallel at some constant load, and without governor control, the spring of the group of arms 16, 17 and 18 which was connected to the torque arm of this generator should be removed, and an additional weight should be added to the counterbalance 15 of this arm. This added counterweight would represent or simulate the constant load applied to one generator and fluctuations in the station load above this constant load would be equitably distributed among the remaining generators according to the characteristics thereof. It is also evident that one or more generators may be shut down at will without affecting the operation of the integrator merely by removing the corresponding torque spring.

While I have described my invention as applied to the indicating of, and regulation of, the load on turbo-generator units, it will be evident that it may also apply to similar situations involving a combination of dependent and independent variables.

The invention may be applied to the allocation of load among a plurality of continuous current generators driven by prime movers because the torque arms are, obviously, cooperable to affect an allocation of load without reference to whether the power system is an alternating current or a continuous current system.

I am aware that many changes may be made and numerous details of construction may be varied through a wide range without departing from the principles of this invention, and I, therefore, do not purpose limiting the patent granted hereon otherwise than necessitated by the prior art.

I claim as follows:

1. An instrument comprising a plurality of mechanisms connected in parallel relation to a load to each carry a portion of such load with different load carrying characteristics, said device comprising a rotatable shaft, an arm secured to the shaft, a weight supported slidable on said arm, a plurality of arms pivoted on said shaft for movement thereon, yieldable means interconnecting the arms to the shaft containers, fluid in said containers, and bodies movable in said fluid connected to said yieldable arms to oppose movement of said shaft by said weight on its supporting arm.

2. An instrument comprising a plurality of mechanisms interconnected to each carry a portion of a load with different load carrying characteristics, said device comprising an arm, a pivot for said arm, means to vary the turning moment of said arm, a plurality of members yieldingly connected to said arm for movement relative thereto, and movable means connected to said members to produce a moment equal and opposite to that of said arm.

3. A measuring instrument, said instrument comprising a plurality of torque producing arms yieldably connected in parallel relation to each other, means to selectively load said arms, means to selectively retard movement of said arms, and means to indicate the sum of the torques produced by said arms.

4. In combination, an instrument comprising a primary torque-producing arm having a weight slidable thereon, a shaft connected to said arm, a plurality of secondary torque-producing arms yieldably connected to said shaft to produce a total torque opposed to that of said primary arm, means to selectively load said secondary arms, a wattmeter energizing means connected to said wattmeter, a plurality of energy transforming devices connected in parallel with said energizing means, means connecting said primary arm and said wattmeter to produce selective movement of said slidable weight, switch means connected to said secondary arms and responsive to movement of said secondary arms, and means connected to said switch means and to said energy transforming devices operable to selectively vary the output of said transforming devices.

5. An instrument comprising a primary torque-producing arm, means to selectively load said arm, a shaft connected to said primary arm, a plurality of secondary torque-producing arms yieldably connected to said shaft to produce a total torque opposed to that of said primary arm, means to selectively load said secondary arms, and means to indicate movement of said primary arm and of said secondary arms, respectively.

6. An instrument comprising a plurality of force-producing members yieldably connected in parallel to a common connecting member, and another force-producing member connected to said common connecting member to weigh the sum of the forces produced by said plurality of yieldably connected members.

7. An instrument comprising a primary lever having means for adjustably varying the torque produced by said lever, a shaft connected to said lever, a plurality of secondary levers yieldably connected to said shaft to produce torque opposed to that of said primary lever, and means connected to said secondary levers to selectively vary the share of opposing torque produced by each of said secondary levers, respectively, as the torque of said primary lever is varied.

8. In combination, a plurality of prime movers connected in parallel, means to selectively apportion a total load among said prime movers according to their operating efficiency, said apportioning means comprising a movable primary member, means to load said member in response to the total load on said prime movers, a plurality of secondary members yieldably connected to said primary member, means simulating certain characteristics of said prime movers connected to said secondary members to selectively retard movement of said secondary members, and means connected to said secondary members to govern the output of said prime movers.

9. Means for selectively apportioning a given whole quantity or sum among a plurality of elements interconnected to each contribute a selected amount of the whole quantity and together contribute the whole quantity, said means comprising a primary force-producing movable member, and a plurality of movable secondary members yieldingly connected in parallel to said primary member, each of said secondary members being provided with means simulating desired characteristics to produce selected opposition to movement of said secondary members in response to movement of said primary member.

10. In combination, a primary member, adjustable means to load said member and produce movement of said member in simulation of variations in a whole quantity, a plurality of secondary members yieldably interconnected to said primary member for movement therewith in simulation of changes in quantities which together give the whole quantity, and means connected with each of said secondary members to selectively resist movement of said secondary members, respectively.

11. An instrument comprising a support, a shaft journaled in said support, a primary lever secured to said shaft, a plurality of secondary levers freely journaled on said shaft, yieldable means connected to said shaft adapted to engage said secondary levers, containers, fluid in said containers, and bodies connected to said secondary levers and buoyantly supported by said fluid.

12. An instrument comprising an arm, a pivot for said arm, means on said arm adjustable to vary the turning moment of said arm, a plurality of members yieldably connected to said arm for movement relative thereto, and movable means connected to said members to produce a moment equal and opposite to that of said arm.

13. An electric power system, means for allocating the load among a plurality of interconnected energy transforming devices connected in parallel to said system and without reference to the frequency of the system, said means comprising a meter connected to said system and having means movable in response to the rate of energy flow in the system, a plurality of members connected in parallel and arranged selectively movable in response to movement of said movable means of said meter, and indicating means on each of said movable members.

14. An instrument comprising a plurality of torque producing arms yieldably connected in parallel, means including a movable weight connected to said arms to indicate the sum of the torque produced by said arms, motor means including a motor circuit connected to move said weight, a wattmeter having a movable element, and switch means responsive to movement of said movable element and of said torque-summating means connected in said motor circuit to produce selective movement of said motor.

15. In combination, a group of energy transforming devices connected in parallel to a power system, and means connected to said power system and to said devices and responsive to energy flow in said system without reference to frequency to selectively determine the energy flow from each of said devices in accordance with their operating characteristics to obtain maximum operating economy for the group, said means comprising a primary member responsive to energy flow in said system, control means for said transforming devices, secondary members connected to said control means and yieldably connected to said primary member and movable in response to movement of said primary member, and means to selectively oppose movement of said secondary arms.

16. A power system having a load connected thereto, a plurality of independently variable units connected in parallel to said system, a plurality of yieldable arms connected in parallel on a shaft and each connected to control the output of one of said units, means connected to each of said arms to selectively oppose movement of said arms, and means responsive to variations in the system load to effect turning of said shaft in response to variations in the system load.

17. A power system having a load connected thereto, a plurality of independently variable units connected in parallel to said system, a plurality of independently variable members connected in parallel to a common member for movement with said common member, means connected to each of said plurality of members to selectively oppose movement of said plurality of members, each of said plurality of members being connected to a unit to control the output of the unit, and means responsive only to variations of the system load connected to effect movement of said common member.

18. In combination, a group of energy transforming units connected in parallel to a transmission system, a plurality of movable secondary control means each of which is connected to control energy flow in a unit, respectively, a master control means responsive to variations in the system load and connected with said secondary control means, and a plurality of means, each simulating desired characteristics of a transforming unit connected to selectively affect movement of said master control means.

WILBER A. CARTER.